No. 875,742. PATENTED JAN. 7, 1908.
R. F. SCHNEIDER.
CLINICAL THERMOMETER ATTACHMENT.
APPLICATION FILED JULY 27, 1907.

Witnesses:
Inventor
Ralph F. Schneider
By his Attorneys

UNITED STATES PATENT OFFICE.

RALPH F. SCHNEIDER, OF NEW YORK, N. Y., ASSIGNOR TO CHARLES J. TAGLIABUE, OF BROOKLYN, NEW YORK.

CLINICAL-THERMOMETER ATTACHMENT.

No. 875,742.  Specification of Letters Patent.  Patented Jan. 7, 1908.

Application filed July 27, 1907. Serial No. 385,878.

*To all whom it may concern:*

Be it known that I, RALPH F. SCHNEIDER, a citizen of the United States, residing in the borough of Bronx, in the city, county, and State of New York, have invented certain new and useful Improvements in Clinical-Thermometer Attachments, of which the following is a specification.

My invention relates to attachments for clinical thermometers and has for its object to construct the usual casing for such thermometers in such a manner as to utilize said casing to subject the thermometer to the action of centrifugal force and thus to return the mercury to the bulb after use, by means of said centrifugal force.

My invention will be fully described hereinafter and the features of novelty will be pointed out in the appended claims.

Reference is to be had to the accompanying drawings in which

Figure 1:
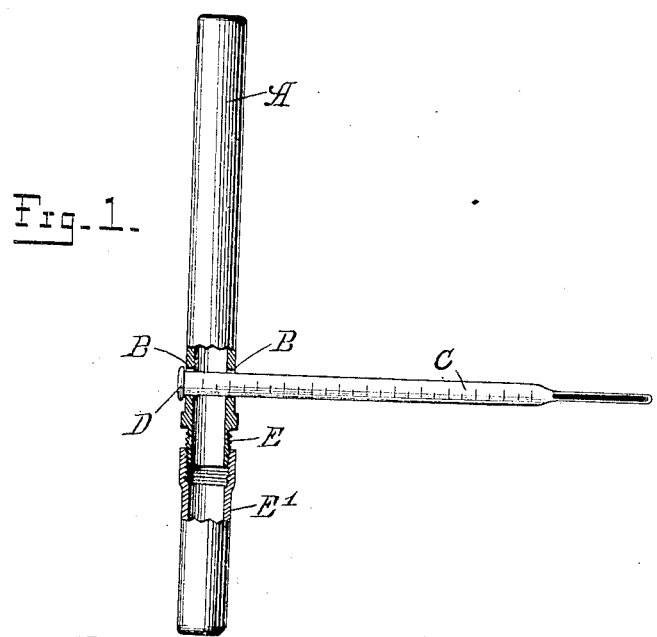
Figure 2:
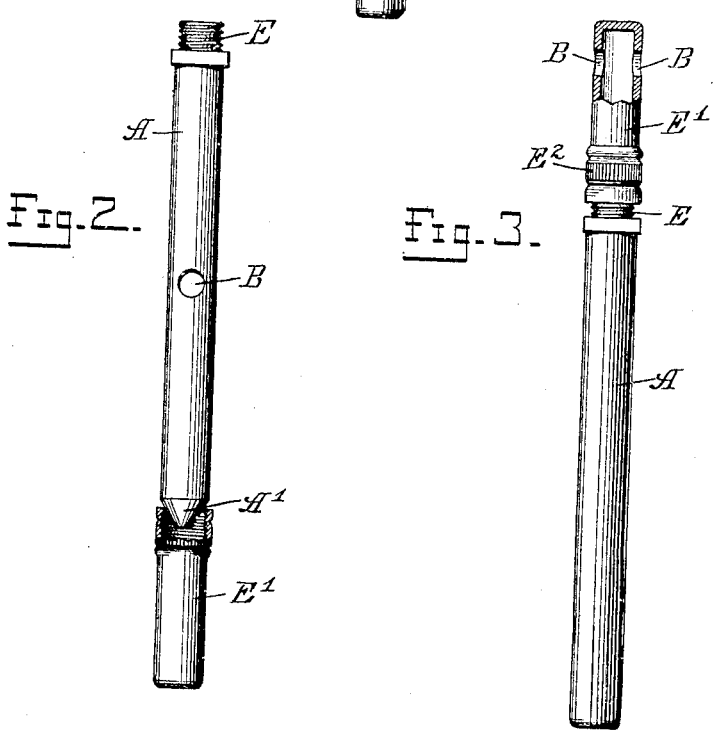

Figure 1 is an elevation of my improved device with parts in section; Fig. 2 is a similar view of another form of my invention, and Fig. 3 is a similar view of still another form of my invention.

Referring more particularly to the form of my invention shown in Fig. 1, A is the usual casing in which the thermometer is carried about when not in use and which is screw-threaded at its open end as indicated at E to receive the cap E'. The casing A is provided near its open end with two diametrically opposite openings B which are slightly larger than the diameter of the body of the thermometer C. A flange or other enlargement D prevents the thermometer from being forced entirely through the openings B. In using this form of my invention the thermometer after having been read is inserted into and through said openings B, as shown in Fig. 1, and the casing A is screwed partly into the cap E'. This cap E' is then held in the left hand and the casing A is rapidly rotated back and forth by the right hand of the person using it, thus causing the thermometer to be rapidly moved back and forth in the arc of a circle. During this operation the cap E' serves as a pivot or bearing to permit the said case to be easily rotated as described. A few turns of the casing with the thermometer in position thereon will cause the centrifugal force to return the mercury to the bulb, thus doing away with the danger of breaking the thermometer as is frequently done when the thermometer is shaken to return the mercury to the bulb.

In the form of my device, shown in Fig. 2, the openings B are located near the center of the casing A and the closed end of said casing is conical as indicated at A'. In using this form, the thermometer is placed in the openings in the same way as shown in Fig. 1 and the conical end A' of the casing is inserted into the open end of the cap E' as shown in Fig. 2. This cap is held in the left hand and the casing A is twirled back and forth by the right hand in the same way as described with regard to the construction shown in Fig. 1. In this instance the open end of the cap serves as a bearing for the conical end of the casing. Otherwise this form of my invention may be the same as the one hereinbefore described.

Figure 3:
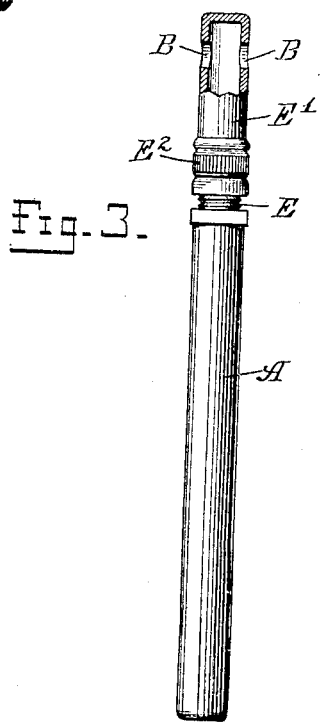

Referring now to Fig. 3, the openings B for receiving the thermometer are located in the cap E' near its closed end and the cap is further provided with an annular milled portion $E^2$. In using this form the casing A is grasped in the left hand and a finger of the right hand is passed back and forth over the milled portion $E^2$ of the cap. This causes the cap with the thermometer in position in the openings B to be rotated back and forth in the same manner and for the same purposes as hereinbefore described. In this form the cap is rotated and the screw-threaded end of the casing forms the bearing or pivot in much the same way as described with regard to Fig. 1.

If desired the form of my invention shown in Fig. 1 may be used without the cap, that is after the thermometer has been placed in the openings B the casing may be simply rolled back and forth between the hands of the user.

My invention is thus extremely simple in construction and effective in operation. It is further cheap to manufacture and can be embodied in present constructions with very little expense.

I am aware that to return the mercury to the bulb of clinical thermometers by centrifugal force is old and do not desire to claim this broadly. I am, however, not aware that the ordinary casing having openings therein to receive the thermometer has ever been used for this purpose.

I claim.

1. The combination of a case provided with openings, a thermometer adapted to be projected through said openings at substantially right angles to the axis of the case, and an enlargement on said thermometer to prevent the thermometer from being forced all the way through said openings.

2. The combination of a case provided with openings, a thermometer adapted to be projected through said openings at substantially right angles to the axis of the case, and an enlargement at one end of said thermometer to prevent the thermometer from being forced all the way through said openings.

RALPH F. SCHNEIDER.

Witnesses:
JOHN LOTKA,
EUGENE EBLE.